C. LE G. FORTESCUE.
HIGH VOLTAGE OUTLET STRUCTURE.
APPLICATION FILED MAY 11, 1914.
1,198,018.
Patented Sept. 12, 1916.
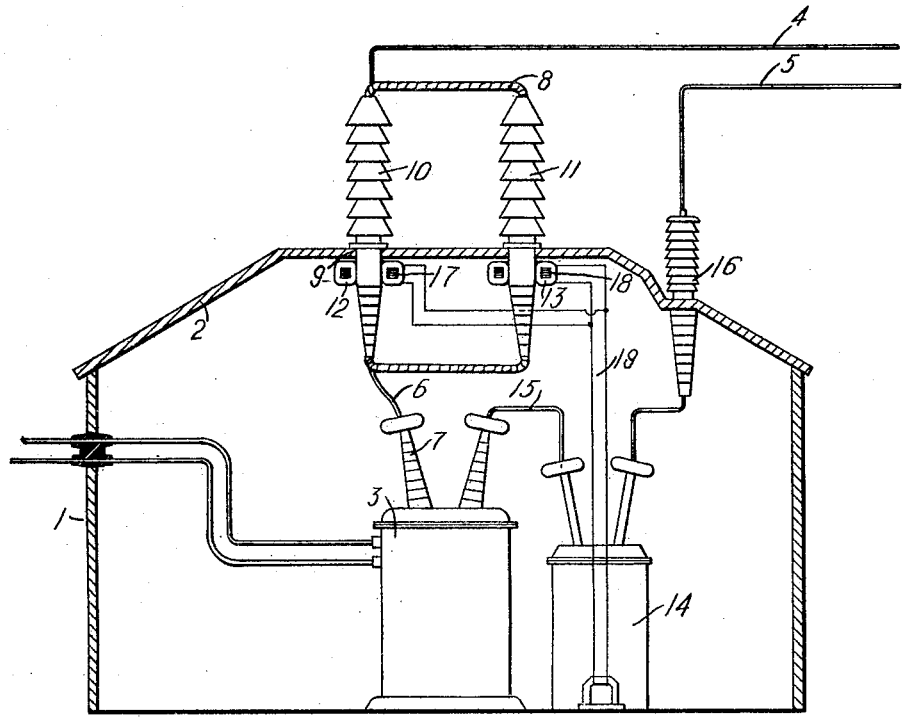
WITNESSES:
Fred. A. Lind.
Geo. W. Hansen.
INVENTOR
Charles Le G. Fortescue
BY
Wesley G. Carr
ATTORNEY

UNITED STATES PATENT OFFICE.

CHARLES LE G. FORTESCUE, OF PITTSBURGH, PENNSYLVANIA, ASSIGNOR TO WESTINGHOUSE ELECTRIC AND MANUFACTURING COMPANY, A CORPORATION OF PENNSYLVANIA.

HIGH-VOLTAGE OUTLET STRUCTURE.

1,198,018.　　　　Specification of Letters Patent.　　Patented Sept. 12, 1916.

Application filed May 11, 1914. Serial No. 837,743.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in High-Voltage Outlet Structures, of which the following is a specification.

My invention relates to high-voltage structures, and it has particular reference to outlet structures which may be utilized jointly for insulating high-voltage leads from walls, etc., and for providing insulated primary coils for current transformers.

In power station construction, it is essential to insulate the power conductors from the walls, roofs, etc., of the station building through which the conductors extend in order to deliver power to supply circuits. Again, current transformers are usually required to actuate circuit breakers, meters and other devices which are adapted to protect the generating apparatus and to ascertain the electrical conditions upon the power system.

Because of the large expense required to furnish separate high-potential bushings, both for outlet structures and for current transformers, that will insure safety to the power station equipment and the attendants thereof, I propose to combine, in a single structure, high-potential bushings which will serve to insulate the high-voltage conductors both from the roofs or walls through which they extend and from the secondary windings of current transformers.

While the various features of novelty which characterize my invention are pointed out with particularity in the appended claims, reference may be had to the accompanying drawing and description for a full understanding of my invention.

For convenience in illustrating my invention, I have shown it in connection with a transformer sub-station, in a single view that is partially sectional, partially elevational and partially diagrammatic.

The sub-station 1 comprises a housing 2 which is made of any suitable material, such as wood faced with corrugated steel. A high-potential transformer 3 is contained within the housing 2 which affords shelter and protection for the transformer and the apparatus associated therewith. High-potential conductors 4 and 5, which lead from the transmission system, conduct high-voltage currents to the transformer 3, where they are transformed to low-voltage currents for distributing purposes or vice-versa. A high-potential lead 6 of the transformer 3, which is adequately insulated from the tank by means of a high potential bushing 7, is connected to the high-potential conductor 4 through a coil 8 which constitutes the primary coil of a current transformer 9. High-potential bushings 10 and 11, which provide an outlet for the lead 6, insulate the lead from the housing 2 and also constitute means for insulating the primary coil 8 from secondary coils 12 and 13.

Inasmuch as it is essential to afford protection to the transformer 3, by means of a circuit interrupting apparatus 14, from overloads and short circuits, it is essential to provide a current transformer by means of which the tripping mechanism associated with the circuit breaker 14 may be operated. By means of my invention, I so combine the outlet structure for the lead 6 with the current transformer 9 as to utilize the minimum number of high-potential bushings, thereby greatly decreasing the cost of building substations, etc.

As the current in the conductor 4 is usually of small value, by reason of the high transmission voltage, it is necessary, in order to accurately determine the current ratio of the transformer 9, to provide the primary winding or coil 8 with a plurality of turns to compensate for the small current flow. To this end, I have provided the primary coil 8 with a plurality of turns which project through the bushings 10 and 11 in order to be adequately insulated from the housing 2. At the same time, a satisfactory outlet structure is provided for the high-potential lead 6. A lead 15, which constitutes the companion to the lead 6 of the transformer 3, extends through the circuit-interrupting apparatus 14 and is connected, through an outlet bushing 16 which projects through the housing 2, to the high-voltage conductor 5.

The current transformer 9 comprises iron cores 17 and 18 which embrace the bushings 10 and 11, respectively. The secondary windings 12 and 13, which are wound upon the cores 12 and 13 and placed in inductive relation thereto, are adequately insulated from said primary winding by reason of the outlet bushings 10 and 11. It is usual to actuate the circuit interrupting apparatus, however, when abnormal conditions obtain upon the transmission system, and, to this end, the operation of the device 14 is controlled by the current flowing in a local circuit 19 to which power is supplied by means of the secondary windings 12 and 13 of the current transformer 9. In order to compensate for the inequality of turns embraced by the bushings 10 and 11, I connect secondary windings 12 and 13 in parallel relation.

From the foregoing explanation, it will be apparent that I have used one insulator less than has heretofore been used to give similar service, namely, to provide, in combination, a high-voltage outlet structure and a current transformer, the secondary coils of which are thoroughly insulated from the primary winding.

I claim as my invention:

1. The combination with a high-voltage transmission line, a high-voltage transformer connected thereto, and a housing for the transformer, of high-voltage bushings projecting through the housing walls and embracing one of the connectors between the transmission line and the transformer which comprises a primary winding of a current transformer, and secondary coils inductively related to the primary winding and embracing said bushings.

2. The combination with a high-voltage transmission line, a high-voltage transformer connected thereto, and a housing for the transformer, of two spaced high-potential bushings projecting through the housing and embracing one of the connectors between the transmission line and the transformer which constitutes a primary coil having at least one complete turn of a current transformer, and secondary coils inductively related to the primary winding and embracing said bushings.

3. The combination with a high-voltage transmission line, a high-voltage transformer connected thereto, and a housing for the transformer, of two spaced high-potential bushings projecting through the housing and embracing opposite legs of a primary coil of a current transformer, said primary coil comprising one of the connectors that extends between the transmission line and the transformer, and secondary coils inductively related to the primary coil and embracing said bushings.

In testimony whereof, I have hereunto subscribed my name this 29th day of April, 1914.

CHARLES LE G. FORTESCUE.

Witnesses:
LENORE FLANAGAN,
B. B. HINES.

Copies of this patent may be obtained for five cents each, by addressing the "Commissioner of Patents, Washington, D. C."